Figure 1:
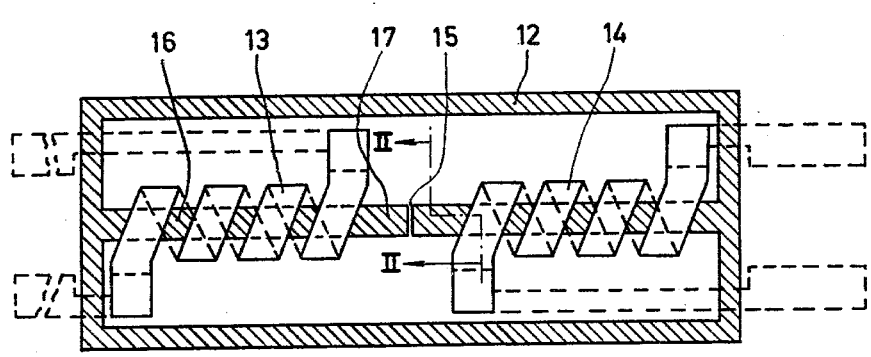

United States Patent [19]

Koel et al.

[11] 4,224,400
[45] Sep. 23, 1980

[54] METHOD OF MANUFACTURING A MAGNETIC HEAD BY PHOTO-ETCHING

[75] Inventors: Gerrit J. Koel; Theodorus C. J. M. Bertens, both of Eindhoven, Netherlands

[73] Assignee: U.S. Philips Corporation, New York, N.Y.

[21] Appl. No.: 708,078

[22] Filed: Jul. 23, 1976

Related U.S. Application Data

[63] Continuation of Ser. No. 529,362, Dec. 4, 1974, abandoned.

[30] Foreign Application Priority Data

Dec. 14, 1973 [NL] Netherlands ............... 7317143

[51] Int. Cl.² ............................................. G03C 5/00
[52] U.S. Cl. .................................... 430/320; 156/656; 430/313; 430/316; 430/318; 430/319; 430/323

[58] Field of Search ............... 29/578; 96/36, 36.2, 96/38.4; 156/11, 13, 18, 655, 652; 430/320, 313, 316, 318, 319, 323

[56] References Cited

U.S. PATENT DOCUMENTS

| | | | |
|---|---|---|---|
| 3,700,508 | 10/1972 | Keen | 156/652 |
| 3,808,070 | 4/1974 | Jordan | 156/8 |
| 3,842,490 | 10/1974 | Seales | 29/578 |

*Primary Examiner*—Edward C. Kimlin
*Attorney, Agent, or Firm*—Robert S. Smith

[57] ABSTRACT

A method of manufacturing a magnetic head wherein a pattern is formed in a nickel-iron layer by means of a photo-etching process. The nickel-iron layer is provided with an auxiliary layer of titanium, titanium oxide or silicon oxide and with a photolacquer layer in a pattern which corresponds to the pattern desired in the nickel-iron layer. The lacquer layer pattern does not cover a part of the auxiliary layer and serves as an etching mask for the simultaneous etching of the auxiliary layer and the nickel-iron layer.

3 Claims, 3 Drawing Figures

U.S. Patent     Sep. 23, 1980     4,224,400

METHOD OF MANUFACTURING A MAGNETIC HEAD BY PHOTO-ETCHING

This is a continuation, of application Ser. No. 529,362, filed Dec. 4, 1974 now abandoned.

The invention relates to a method of manufacturing a magnetic head for recording and playing back information, in which a pattern is formed in a layer which contains a magnetisable nickel-iron alloy by means of a photo-etching process, and to a magnetic head manufactured by means of the method according to the invention. A nickel-iron alloy is to be understood to mean herein an alloy which may contain in addition to nickel and iron other metals, such as chromium, molybdenum, titanium or niobium.

The said pattern has, for example, tracks in the form of two rectangles connected together by a long side and the common long side of which has turns and is interrupted in the centre by a gap.

In practice it is desirable for a nickel-iron pattern to have at least locally inclined edges so that insulation material and/or turns to be provided on the pattern show no discontinuities.

It may furthermore be desirable for such patterns to have locally steep slopes, namely at the area where the pattern is interrupted by a gap. For a high frequency magnetic head the pattern at the area of a gap is chosen to be comparatively narrow so as to increase the information density in disk memories so that, when the width of the slopes of the edge of the pattern and the track width are of comparable dimensions, the poleshoes can easily be manufactured in a reproducible width. Moreover, slopes near the poleshoes cause undesired stray fields in the recording medium.

It is known to form a pattern having inclined edges in a layer by means of a photoetching process, in which a pattern of photolacquer is provided on the layer and the layer is etched in a bath which removes the bond between the photolacquer and the material of the underlying layer so that acceleraed underetching occurs and an inclined edge is formed.

In metallic substrata little variation in the slope of the edge can be obtained with this method and the angles of inclination of the edges are usually large and poorly reproducible. Moreover, if a profile having inclined edges is to be obtained locally only, a photomask has to be aligned two times on a photolacquer layer, namely accurately with respect to each other, in which once inclined edges and once steep edges are obtained by etching in different baths.

In another photomechanical method of obtaining a pattern having inclined edges, an auxiliary layer is used between the layer to be etched and the layer of photolacquer, said auxiliary layer having an etching rate which is larger than that of the layer to be etched. In this method underetching of the auxiliary layer below the layer of photolacquer occurs and the layer to be etched becomes accessible over a wider region so that inclined edges can be formed.

A drawback of this method is that the etching rate of the auxiliary layer must be higher, but may not be much higher, than that of the layer to be etched. This latter occurs when the auxiliary layer and the layer to be etched are more or less conductive and can form a galvanic element as a result of which the auxiliary layer often dissolves far too quickly.

The drawbacks hold in particular for nickel-iron layers from which layers of photolacquer can be detached by etching in a reproducible manner only with difficulty and in which furthermore auxiliary layers of a suitable composition can be found with difficulty which moreover can be provided in such circumstances that the magnetic properties of the nickel-iron layer do not deteriorate considerably.

One of the objects of the invention is to avoid or at least substantially mitigate the above-mentioned drawbacks.

The method described in the preamble is characterized in that the nickel-iron layer is provided with an auxiliary layer of at least one material which belongs to the groups consisting of titanium, titanium oxide and silicon oxide and with a layer of photolacquer in a pattern which corresponds to the pattern which is desired in the nickel-iron layer and which partly does not cover the auxiliary layer, after which the auxiliary layer and the nickel-iron layer are simultaneously etched in a suitable etching bath.

The expressions titanium oxide and silicon oxide, respectively, are to be understood to include in this connection both compounds of the elements having a stoichiometric and non-stoichiometric compositions.

With auxiliary layers having a composition as described above, patterns having bevelled edges whose angle of inclination can be adjusted within wide limits can be etched in nickel-iron layers.

For that purpose, prior to etching, the auxiliary layer extends beyond the photolacquer pattern at least to a distance $d/\text{tg}\,\alpha$, where $d$ is the desired etching depth in the nickel-iron layer and $\alpha$ is the desired angle of inclination of the edge of the nickel-iron pattern.

In principle the auxiliary layer may cover the whole surface of the nickel-iron layer.

However, the method according to the invention is preferably used when the nickel-iron pattern is to have locally bevelled edges and locally steep edges. For that purpose the auxiliary layer is provided in a pattern and the photolacquer pattern which is provided on the auxiliary layer leaves a part of the nickel-iron layer uncovered.

The pattern in the auxiliary layer may also be obtained by means of a photoetching process, in which, as will be described hereinafter, the photomasks in this and the subsequent photoetching step need not be aligned accurately on each other.

The auxiliary layers of the said composition may be provided by vapour deposition or by sputtering in an oxygen-depleted, preferably oxygen-free atmosphere so that the magnetic properties of the nickel-iron layer are not attacked.

The thickness of the auxiliary layer is, for example, less than 0.1 $\mu$m, while the thickness of the nickel-iron layer may be a multiple thereof, for example, approximately 2 $\mu$m.

The nickel-iron layer is preferably etched in a hydrogen peroxide sulphuric acid bath, while the angle of inclination $\alpha$ can be adjusted by adding hydrogen fluoride, $\alpha$ decreasing when the HF concentration increases.

Patterns whose edges have reproducibly adjustable angles of inclination can be formed in rather thick nickel-iron layers by means of the method according to the invention.

In high frequency magnetic heads, laminated patterns which are constructed from layers of nickel-iron which are separated from each other by insulating layers, for example silicon-oxide layers, are often used in high-frequency magnetic heads, inter alia to avoid eddy-current losses.

The method according to the invention may also be used for the formation of such laminated patterns. For that purpose the layer which comprises the magnetisable nickel-iron alloy is constructed from sub-layers which alternately consist of the nickel-iron alloy and an insulation material, the latter being chosen to be so that the etching rate of the insulation material is substantially equal to, at least not larger than, that of the nickel-iron alloy.

It has proved readily possible to provide as an auxiliary layer silicon oxide, for example, by sputtering, in such manner that it etches considerably more rapidly than the silicon oxide used as an insulation material and also provided by sputtering.

The invention will now be described in greater detail with reference to an example and the accompanying drawing.

Figure 2:
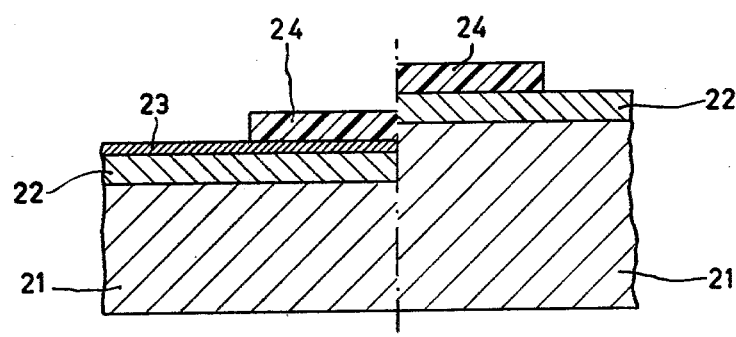
Figure 3:
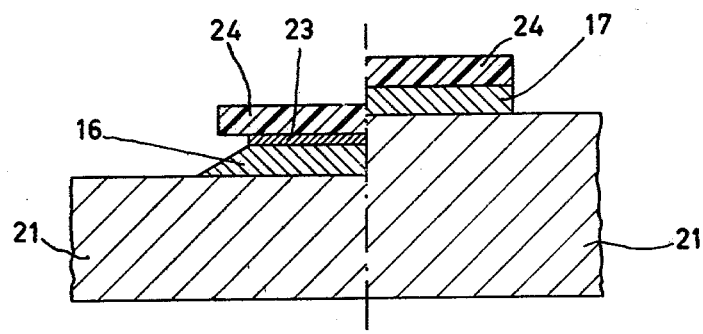

In the drawing, FIG. 1 is a diagrammatic plan view of a magnetic head manufactured by means of the method according to the invention, and FIGS. 2 and 3 are diagrammatic sectional views taken on the line II—II of the device shown in FIG. 1 in successive stages during the performance of the method according to the invention.

FIG. 1 is a plan view of a magnetic head for recording and playing back information in a magnetisable medium. The numeral 12 denotes a layer-shaped nickel-iron core of which a layer part 16 is surrounded by turns 13 and 14 which are insulated from said part. The higher central portion 17 of the layer part 16 has a gap 15.

At the area of the central portion 17 which in FIGS. 2 and 3 is shown in the right-hand part, the layer part 16 must preferably have steep edges so as to be able to accurately adjust the width of the gap 15 and to avoid undesired stray fields in the recording medium.

At the area of the turns, shown in the left-hand part in FIGS. 2 and 3, the layer part 16 is to have bevelled edges so as to be able to provide insulation material and turns over the edges in a fracture-free manner.

In a method of manufacturing the above-described magnetic head, a pattern in the form of the above-described core 12 is provided by means of a photo-etching process in a layer which contains a magnetisable nickel-iron alloy.

A nickel-iron layer 22, for example, 2 $\mu$m thick, is provided by sputtering on a silicon substrate 21 which has a silicon oxide layer (not shown). In order to improve the adhesion of the nickel-iron on the silicon oxide, an approximately 50 A thick intermediate layer of, for example, titanium oxide (TiO$_x$) may be used.

According to the invention, the layer 22 is provided, for example by sputtering, with an auxiliary layer 23 of at least a material which belongs to the group consisting of titanium, titanium oxide and silicon oxide, for example titanium. The titanium layer 23 is, for example, 0.04 $\mu$m thick.

The titanium layer 23 is preferably provided in a pattern which does not cover the part 17 of the layer 22, for example, by means of a usual photoetching treatment. A layer of photolacquer 24 is then provided in a pattern which corresponds to the pattern which is desired in the nickel-iron layer 22 and which does partly not cover the auxiliary layer 23, as well as a part of the layer 22, after which the auxiliary layer 23 and the nickel-iron layer 22 are simultaneously etched in a suitable etching bath.

As an etching bath is preferably chosen a bath which consists of an aqueous solution of sulphuric acid and hydrogen peroxide, for example, 9 parts by volume of hydrogen peroxide, 17 parts by volume of sulphuric acid having a specific gravity of 1.96 and 50 parts by volume of water.

If 1, 2 or 4 parts by volume of 40% by weight hydrogen fluoride are added to said etching bath, the nickel-iron layer 22 is etched in the desired pattern at room temperature at the area where the titanium layer 23 is present, the edges having angles of inclination of approximately 56°, 37° and 20°, respectively.

Finally, the layer of photolacquer 24 may be removed as well as the layer 23, the latter, for example, with a 1% hydrogen fluoride solution.

As a rule, variations in the thickness of the auxiliary layer 23 have little influence on the value of the angle of inclination.

In a prefereed embodiment of the method according to the invention the layer 22 is constructed from sub-layers which alternatively consist of the nickel-iron alloy and the insulation material, the etching rate of the insulation material being smaller than or equal to that of the nickel-iron alloy. On a silicon substrate having a silicon oxide layer, a nickel-iron layer which is, for example, 0.5 $\mu$m thick, and thereon a 0.1 $\mu$m thick silicon oxide layer may alternately be provided. If desired, an approximately 50 A thick titanium oxide layer is provided on the silicon oxide layers.

The auxiliary layer may be a 0.1 $\mu$m thick silicon oxide layer which of course must have a larger etching rate than the silicon oxide sub-layers.

This is achieved, for example, by using a higher substrate temperature during the sputtering of the silicon oxide sub-layer than in sputtering the silicon-oxide auxiliary layer.

A suitable etching bath for the described composite layer is the above-mentioned sulphuric acid peroxide bath to which a solution of hydrogen fluoride and ammonium fluoride is added.

The invention is not restricted to the above-described examples. In practice many variations are possible to those skilled in the art without departing from the scope of the invention.

What is claimed is:

1. A method of manufacturing a magnetic head for recording and playing back information which has a generally planar layer having some edges which are substantially perpendicular to the layer and some bevelled edges which comprises:
   providing a magnetisable nickel-iron alloy layer;
   providing an auxiliary layer of at least one material which belongs the group consisting of titanium, titanium oxide, and silicon oxide on a portion of said nickel-iron layer where it is desired to provide bevelled edges on said nickel-iron alloy layer;
   providing a photolacquer layer on said auxiliary layer in a predetermined pattern which corresponds to a predetermined pattern which is desired in said nickel-iron layer, said pattern extending over less than the entire extent of said auxiliary layer;
   etching said auxiliary layer and said nickel-iron layer simultaneously in a single etching bath to produce bevelled edges on said nickel-iron layer adjacent to said auxiliary layer and substantially vertical edges where said auxiliary layer is not present, said etching bath containing sulphuric acid, hydrogen peroxide and a fluoride.

2. A method as claimed in claim 1, wherein said auxiliary layer is provided in a predetermined pattern and said predetermined photolacquer pattern extending over less than the entire extent of said nickel-iron layer.

3. A method as claimed in claim 1 wherein said magnetisable nickel-iron alloy layer comprises a plurality of sub-layers which alternately consist of the nickel-iron alloy and an insulation material, said insulating material having an etching rate which is not larger than that of the nickel-iron alloy.

* * * * *